(12) United States Patent
Branson et al.

(10) Patent No.: US 8,291,330 B2
(45) Date of Patent: Oct. 16, 2012

(54) MOVING DATA BETWEEN VIEWS

(75) Inventors: Michael John Branson, Rochester, MN (US); George Francis DeStefano, Rochester, MN (US); Gregory Richard Hintermeister, Rochester, MN (US); Andrew James Streit, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1768 days.

(21) Appl. No.: 10/687,291

(22) Filed: Oct. 16, 2003

(65) Prior Publication Data
US 2005/0086247 A1    Apr. 21, 2005

(51) Int. Cl.
*G06F 3/048*    (2006.01)
(52) U.S. Cl. ................. 715/764; 715/788; 715/798
(58) Field of Classification Search .................. 715/800, 715/810, 811, 815, 764
See application file for complete search history.

(56) References Cited

U.S. PATENT DOCUMENTS

| | | | | |
|---|---|---|---|---|
| 4,974,173 A | * | 11/1990 | Stefik et al. | 715/751 |
| 5,684,969 A | * | 11/1997 | Ishida | 715/800 |
| 5,818,446 A | | 10/1998 | Bertram et al. | |
| 6,185,588 B1 | | 2/2001 | Olson-Williams et al. | |
| 6,826,553 B1 | * | 11/2004 | DaCosta et al. | 1/1 |

FOREIGN PATENT DOCUMENTS

WO    WO 03/104966 A2  *  12/2003

OTHER PUBLICATIONS

U.S. Appl. No. 09/434,798, "Method and System for User-Selectable Shell from Web Server", Dunsmoir et al., filed Nov. 5, 1999.
Bartram et al; "The Continuous Zoom: A Constrained Fisheye Technique for Viewing and Navigating Large Information Spaces", Graphics and Multimedia Research Laboratory Center for Systems Science, Simon Fraser University, Burnaby, B.C. V5A 1S6 Canada.

* cited by examiner

*Primary Examiner* — Haoshian Shih
(74) *Attorney, Agent, or Firm* — Owen J. Gamon (57) ABSTRACT

A method, apparatus, system, and signal-bearing medium that in an embodiment present a main view and at least one peek view of data. When the user selects to move the data from the main view to the peek view, a subset of data objects in the main view is selected based on an importance of the data objects and optionally based on the size of the peek view. The subset is copied to the peek view, and the peek view is dynamically updated when the data objects are updated. In this way, the user can monitor changes to the peek view while working on other data in the main view.

14 Claims, 4 Drawing Sheets

| DATA OBJECT | VIEW | IMPORTANCE | SORT RULE |
|---|---|---|---|
| TASK NAME | MAIN, PEEK1 | 1 | ASCENDING |
| STATUS | MAIN, PEEK1 | 1 | NONE |
| USER | MAIN | 2 | NONE |
| TYPE | MAIN | 3 | NONE |

TAGS

MOVING DATA BETWEEN VIEWS

FIELD

This invention generally relates to computers and more specifically relates to moving data between multiple views of a user interface.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs.

One important use of computer systems is to provide users with the ability to monitor, access, and interact with data objects as the data changes. For example, a computer that is executing multiple processes or jobs may have a systems management console that provides the system administrator the capability to monitor the status of the various processes in the computer and modify control parameters that are input to the processes. In another example, a computer may represent physical world objects as data objects and allow a user to monitor, access, and interact with the physical objects via the data objects. Representing various machines or equipment in a factory setting, various generators in an electrical utility, or various switches in a rail-yard are all examples of representing physical objects via data objects. Visual debugger applications and web portal interfaces are further examples of monitoring and interacting with data objects.

Typically, the data objects are displayed on a workspace on the user's computer monitor in multiple views, where the multiple views can be seen individually or all at the same time. Often, the user interacts mostly with a main view, and a number of auxiliary views either support the main view or provide additional information. The main reason for the workspace user interface with the multiple views is to help the user navigate through a large data set. A computer system may have hundreds of lists of data objects and thousands of objects, and keeping track of the data in an organized manner is critically important. A workspace provides an organization and a structure for the data, where users can view the data in which they are most interested in the main view while keeping track of other pieces of data in the auxiliary view.

Many times when users are working in a first view, an event that requires their attention interrupts them and causes them to switch to a second view. The problem is that current workspaces do not provide a satisfactory way for users to work with the second view while still monitoring the first view. Currently, users attempt to handle this problem by resizing the views, e.g., resizing the second view to be larger and the first view to be smaller. But, this is cumbersome and time consuming and makes the data in the first view harder to see since the first view is smaller, critical data is mixed in with information data, and mostly likely the user will need to scroll within the smaller view to see the critical data. Some products provide functions called skins, setups, or layouts, which alter the format of the data in the views, but these are time-consuming and cumbersome to use, and still suffer from the problem of the data being difficult to see when the view becomes smaller.

Without a better way to handle multiple views of data, users will continue to suffer with the inconvenience of not being able to see and monitor all of their data.

SUMMARY

A method, apparatus, system, and signal-bearing medium are provided that in an embodiment present a main view and at least one peek view of data. When the user selects to move the data from the main view to the peek view, a subset of data objects in the main view is selected based on an importance of the data objects and optionally based on the size of the peek view. The subset is copied to the peek view, and the peek view is dynamically updated when the data objects are updated. In this way, the user can monitor changes to the peek view while working on other data in the main view.

DETAILED DESCRIPTION

A rendering agent presents a main view of data objects and at least one peek view. In response to a pull command from the peek view, the rendering agent selects a subset of the data objects in the main view and copies the subset to the peek view. The rendering agent may select the subset based on an importance ranking of the data objects and optionally based on the size of the peek view that was the source of the pull command, with larger peek views receiving a larger subset. The rendering agent updates the subset in the peek view as the rendering agent receives updates to the data objects. The peek view may also issue a push command, which the rendering agent responds to by restoring the data objects to the main view. In this way, the user can monitor a subset of important information regarding dynamically changing data objects in the smaller peek view while continuing to work with other data objects in the larger main view.

Figure 1:
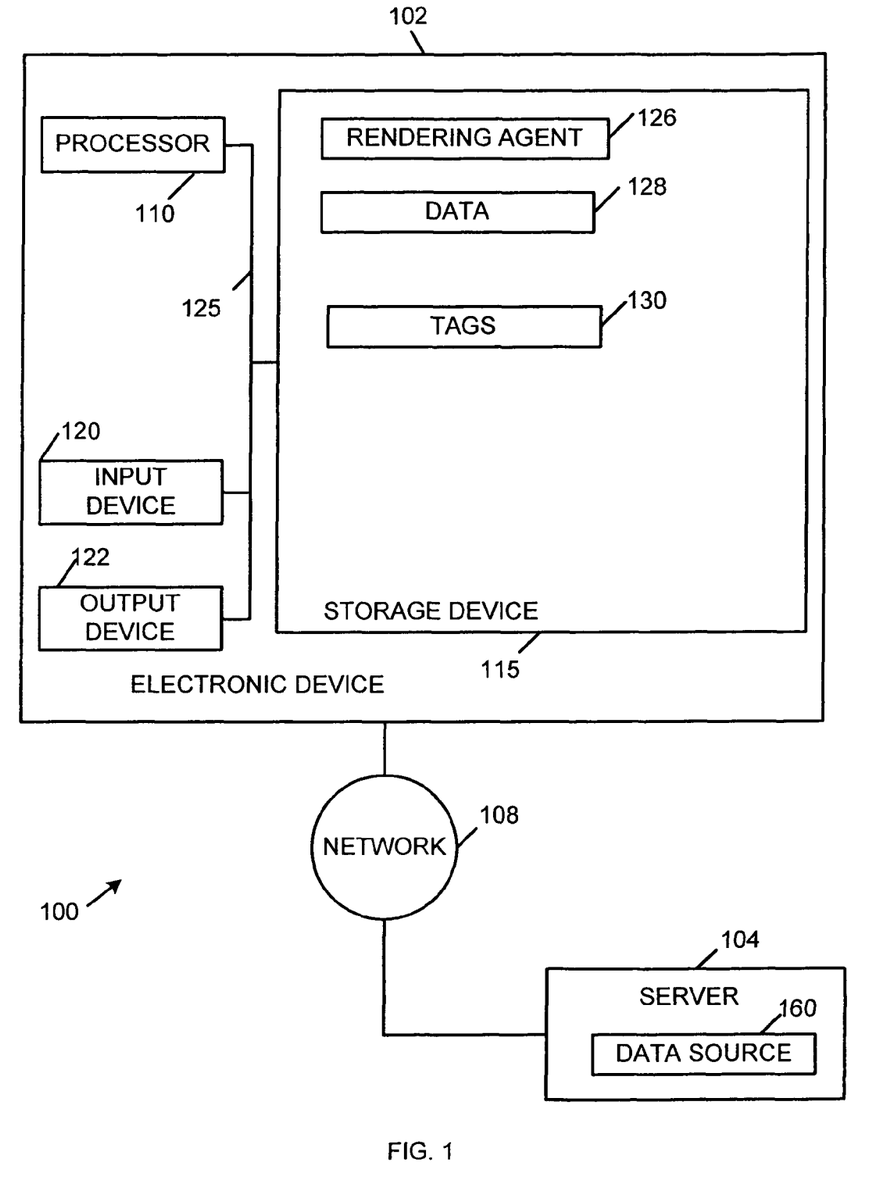
FIG. 1 depicts a block diagram of an example system for implementing an embodiment of the invention.

Referring to the Drawing, wherein like numbers denote like parts throughout the several views, FIG. 1 depicts a block diagram of an example system 100 for implementing an embodiment of the invention. The system 100 includes an electronic device 102 connected to a server 104 via a network 108. Although only one electronic device 102, one server 104, and one network 108 are shown, in other embodiments any number or combination of them may be present. Although the electronic device 102, the server 104, and the network 108 are illustrated in FIG. 1 as being discrete, separate components, in other embodiments some or all of their functions and elements may be combined.

In an embodiment, the electronic device 102 functions as a client that sends requests to and receives responses from the server 104. The electronic device 102 includes a processor 110, a storage device 115, an input device 120, and an output device 122, all connected directly or indirectly via a bus 125. The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the electronic device 102 that controls the operation of the entire electronic device. Although not depicted in FIG. 1, the processor 110 typically includes a control unit that organizes data and program storage in memory and transfers data and other information between the various parts of the electronic device 102. The processor 110 reads and/or writes code and data to/from the storage device 115, the network 108, the input device 120, and/or the output device 122.

Although the electronic device 102 is drawn to contain only a single processor 110 and a single bus 125, embodiments of the present invention apply equally to electronic devices that may have multiple processors and multiple buses with some or all performing different functions in different ways.

The storage device 115 represents one or more mechanisms for storing data. For example, the storage device 115 may include read only memory (ROM), random access memory (RAM), magnetic disk storage media, optical storage media, flash memory devices, and/or other machine-readable media. In other embodiments, any appropriate type of storage device may be used. Although only one storage device 115 is shown, multiple storage devices and multiple types of storage devices may be present. Although the storage device 115 is shown in FIG. 1 as a single monolithic entity, the storage device 115 may in fact be distributed and/or hierarchical, as is known in the art. For example, the storage device 115 may exist in multiple levels of storage devices, and these levels of storage devices may be further divided by function, so that one level of storage device holds, e.g., instructions while another holds, e.g., non-instruction data which is used by the processor or processors. The storage device 115 may further be distributed and associated with different processors or sets of processors, as is known in any of various so-called non-uniform memory access (NUMA) computer architectures. Further, although the electronic device 102 is drawn to contain the storage device 115, it may be distributed across other electronic devices, such as electronic devices connected to the network 108.

The storage device 115 includes a rendering agent 126, data 128, and tags 130, all of which may in various embodiments have any number of instances. Although the rendering agent 126, the data 128, and the tags 130 are all illustrated as being contained within the storage device 115 in the electronic device 102, in other embodiments some or all of them may be on different electronic devices and may be accessed remotely, e.g., via the network 108.

The rendering agent 126 receives data from the server 104, stores the received data in the data 128, and presents the data 128 in multiple views (as further described below with reference to FIG. 2) via the output device 122. The data 128 may be any appropriate data or information. The tags 130 specify how the data is to be presented in the multiple views. An example data structure for the tags 130 is further described below with reference to FIG. 3.

In an embodiment, the rendering agent 126 includes instructions capable of executing on the processor 110 or statements capable of being interpreted by instructions executing on the processor 110 to present the user interface as further described below with reference to FIG. 2, to manipulate the tags 130 as further described below with reference to FIG. 3, and to perform the functions as further described below with reference to FIG. 4. In another embodiment, the rendering agent 126 may be implemented in hardware via logic gates and/or other appropriate hardware techniques in lieu of or in addition to a processor-based system.

The input device 120 may be a keyboard, mouse or other pointing device, trackball, touchpad, touchscreen, keypad, microphone, voice recognition device, or any other appropriate mechanism for the user to input data to the electronic device 102 and/or to manipulate the user interfaces of the electronic device 102. Although only one input device 120 is shown, in another embodiment any number and type of input devices may be present. The input device 120 may be used to interact with and manipulate the user interfaces of the electronic device 102.

The output device 122 is that part of the electronic device 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number of output devices of different types or of the same type may be present. The output device 122 may display or otherwise present the user interfaces of the electronic device 102.

The bus 125 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller). Although the bus 125 is shown in FIG. 1 as a relatively simple, single bus structure providing a direct communication path among the processor 110, the storage device 115, the input device 120, and the output device 122, in other embodiments the bus 125 may comprise multiple different buses or communication paths, which may be arranged in any of various forms, such as point-to-point links in hierarchical, star or web configurations, multiple hierarchical buses, or parallel and redundant paths. Furthermore, while the bus 125 is shown directly connected to the processor 110, the storage device 115, the input device 120, and the output device 122, in other embodiments, some or all of the I/O (Input/Output) devices may be connected via I/O processors.

The electronic device 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations of the electronic device 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The server 104 may be an electronic device including hardware and optional software components analogous to the electronic device 102 previously described above. The server 104 receives requests for information from the electronic device 102 and returns responses to the electronic device 102. The server includes a data source 160, which is a source of the data 128 in the electronic device 102.

The network 108 may be any suitable network or combination of networks and may support any appropriate protocol suitable for communication of data and/or code to/from the electronic device 102 and/or between the electronic device 102 and the server 104. In various embodiments, the network 108 may represent a storage device or a combination of storage devices, either connected directly or indirectly to the electronic device 102 and the server 104. In an embodiment, the network 108 may support Infiniband. In another embodiment, the network 108 may support wireless communications. In another embodiment, the network 108 may support hard-wired communications, such as a telephone line or cable. In another embodiment, the network 108 may support the Ethernet IEEE (Institute of Electrical and Electronics Engineers) 802.3x specification. In another embodiment, the network 108 may be the Internet and may support IP (Internet Protocol). In another embodiment, the network 108 may be a local area network (LAN) or a wide area network (WAN). In another embodiment, the network 108 may be a hotspot service provider network. In another embodiment, the network 108 may be an intranet. In another embodiment, the network 108 may be a GPRS (General Packet Radio Service) network. In another embodiment, the network 108 may be a FRS (Family Radio Service) network. In another embodiment, the network 108 may be any appropriate cellular data network or cell-based radio network technology. In another embodiment, the network 108 may be an IEEE 802.11B wireless network. In still another embodiment, the network 108 may be any suitable network or combination of networks. Although one network 108 is shown, in other embodiments any number of networks (of the same or different types) may be present.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the electronic device 102, and that, when read and executed by one or more processors in the electronic device 102, cause the electronic device to perform the steps necessary to execute steps or elements embodying the various aspects of an embodiment of the invention.

Moreover, while embodiments of the invention have and hereinafter will be described in the context of fully functioning electronic devices, the various embodiments of the invention are capable of being distributed as a program product in a variety of forms, and the invention applies equally regardless of the particular type of signal-bearing medium used to actually carry out the distribution. The programs defining the functions of this embodiment may be delivered to the electronic device 102 via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, e.g., the network 108, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
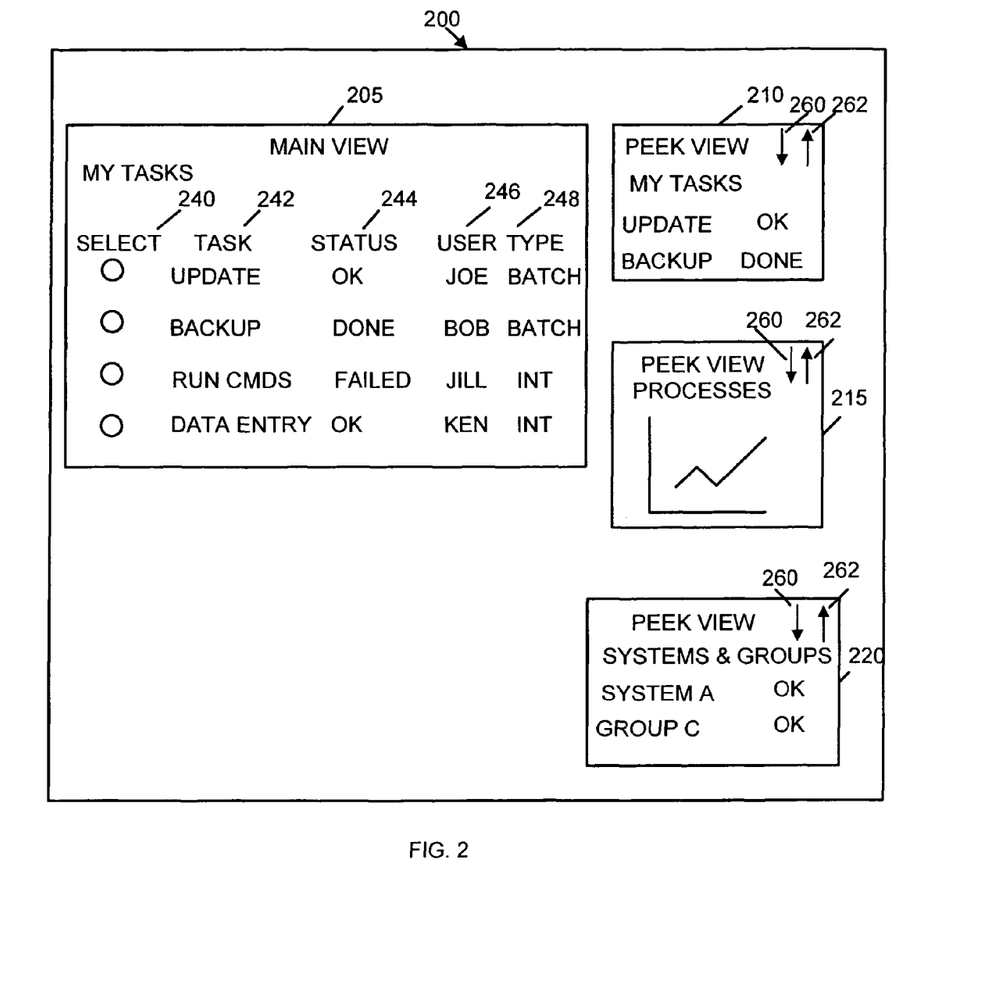
FIG. 2 depicts a pictorial representation of an example user interface, according to an embodiment of the invention.

FIG. 2 depicts a pictorial representation of an example user interface 200, according to an embodiment of the invention. The rendering agent 126 may present the user interface 200 via the output device 122. The user interface 200 includes a main view 205, a peek view 210, a peek view 215, and peek view 220. Although the example of FIG. 2 illustrates one main view 205 and three peek views 210, 215, and 220, in other embodiments any number and combination of them may be present and the data illustrated is for example purposes only, and any appropriate data may be used. Some or all of the main view 205 and the peek views 210, 215, 220 may use a scrollbar (unillustrated) or other mechanism for viewing more data than can be displayed at one time with the respective view.

The main view 205 includes a number of data objects, such as select data object 240, a task data object 242, a status data object 244, a user data object 246, and a type data object 248. Each of the data objects 240, 242, 244, 246, and 248 includes data. For example, the select data object 240 includes a column of selection icons for selecting additional information about a task in the task data object 242; the task data object 242 includes a column of task names that are operating at the electronic device 102; the status data object 244 includes a column of status for each of the associated tasks in the task data object 242; the user data object 246 includes a column of users that initiated the respective tasks in the task data object 242; and the type data object 248 includes a column of task types for the respective tasks in the task data object 242. Although the main view 205 is illustrated in a table format with rows and columns for the data in the data objects, in other embodiments the data objects may have an icon format, image format, video format, graphical format, block diagram format, flowchart format, or any other appropriate format.

Each of the peek views 210, 215, and 220 include a pull icon 260. When the pull icon 260 is selected, the rendering agent 126 selects a subset of the data objects (e.g., the data objects 240, 242, 244, 246, and 248) in the main view 205 and copies the subset to the peek view from which the pull icon 260 was selected. The rendering agent 126 then dynamically updates the subset as the data objects change. In the example illustrated in FIG. 2, the pull icon 260 in the peek view 210 was most recently selected, which resulted in the rendering agent 126 selecting the subset as the task data object 242 and the status data object 244 and copying that subset's data to the peek view 210. Notice that the data for the select data object 240, the user data object 246, and the type data object 248 are not part of the subset that the rendering agent 126 selected in this example. The rendering agent 126 makes the selection of the subset based on the tags 130 (FIG. 1). The pull icons in the peek views 215 and 220 were selected at some point in the past at a time when the main view 205 contained different data ("processes" data for the peek view 215 and "systems & group" data for the peek view 220).

The data illustrated in the peek views 210, 215, and 220 is dynamic, meaning that the rendering agent 126 updates the data in the peek views 210, 215, and 220 as the rendering agent 126 receives updated data from the data source 160 in addition to updating the dynamic data in the main view 205. Thus, the main view 205 and the peek views 210, 215, and 220 and their associated pull icon 260 allow the user to switch to working on different data in the main view 205 while still monitoring updates to previously used data in the peek views 210, 215, and 220.

The peek views 210, 215, and 220 also include respective push icons 262. When the push icon 262 is selected, the rendering agent 126 copies the data in the respective peek view back to the main view 205 and also restores the data to the main view 205 that was not in the selected subset. The rendering agent 126 then continues to dynamically update the copied data, as previously described above. In this way, when the user notices, e.g., a status change in the peek view that requires the user's action, the user can push the data back to the main view 205 to work on it with the additional, non-critical data shown.

The icons illustrated for the pull icon 260 and the push icon 262 are exemplary only and any appropriate icon or command selection technique may be used, such as pop-up menus or a drag-and-drop interface.

Figure 3:
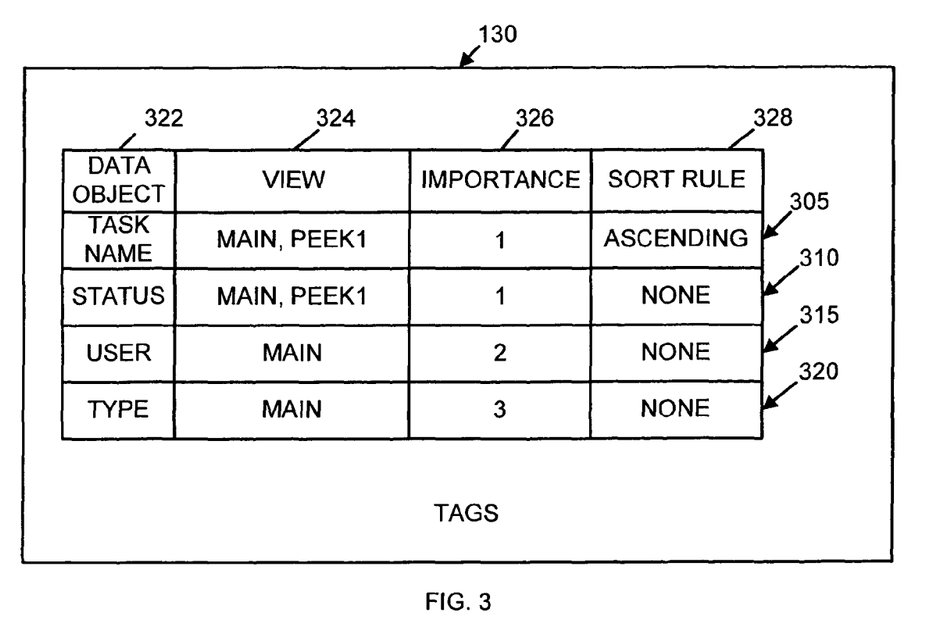
FIG. 3 depicts a block diagram of an example tags data structure, according to an embodiment of the invention.

FIG. 3 depicts a block diagram of an example data structure for the tags 130, according to an embodiment of the invention. The tags 130 include records 305, 310, 315, 320, but in other embodiments any number of records with any appropriate data may be present. Each record (e.g., records 305, 310, 315, and 320) includes a number of fields, such as a data object field 322, a view field 324, an importance field 326, and a sort rule field 328.

The data object field 322 identifies an associated data object. For example "task name" in the data object field 322 of the record 305 identifies the task object 242 in FIG. 2; "status" in the data object field 322 of the record 310 identifies the status object 244 in FIG. 2; "user" in the data object field 322 of the record 315 identifies the user data object 246 in FIG. 2; and "type" in the data object field 322 of the record 320 identifies the type object 248 in FIG. 2.

The view field 324 indicates in which view the data of the associated data object 322 is displayed. For example, "main, peek1" in the view field 324 of the records 305 and 310 indicate that the task data object 242 and the status data object 244 are currently displayed in both the main view 205 and the peek view 210. Similarly, "main" in the view field 324 of the records 315 and 320 indicate that the user data object 246 and the type data object 248 are currently displayed in only the main view 205.

The importance field 326 indicates the importance or ranking of the data object in the respective data object field 322. The rendering agent 126 uses the importance 326 to determine whether to include the associated data object in the subset of the data objects that are displayed in the peek view. In an embodiment, the rendering agent 126 uses the importance 326 along with the size of the peek view in selecting the subset. For example, the larger the size of the peek view, the larger the subset of selected data objects, where the rendering agent 126 selects those data objects with the highest importance first. In another embodiment, the importance 326 may be a binary decision, such as "yes" for displaying the data object in any peek view and "no" for not displaying the data object in any peek view. In the example of FIG. 2, only the task data object 242 and the status data object 244 are illustrated in the peek view 210 because only their associated records 305 and 310 have the highest importance. In an embodiment, the rendering agent 126 obtains the values for the importance 326 from the data source 160, but in other embodiments the values may be obtained from the user or from any other appropriate source.

The sort rule field 328 indicates a rule for sorting the data in the peek view and/or the main view. For example, "ascending" indicates that the rendering agent 126 sorts the data in ascending order based on the task name, but in other embodiments a descending rule or any other appropriate sort rule may be used. In an embodiment, the rendering agent 126 obtains the values for the sort rule field 328 from the data source 160, but in other embodiments the values may be obtained from the user or from any other appropriate source.

The format for the data structure for the tags 130 is exemplary only, and in other embodiments any appropriate format may be used. For example, in another embodiment, the tags 130 are formatted as a master data table (with information about all the data objects, their importance, and sort rules) and view-tables for each of the views, with each view-table including records indicating the data objects present in the respective view.

Figure 4:
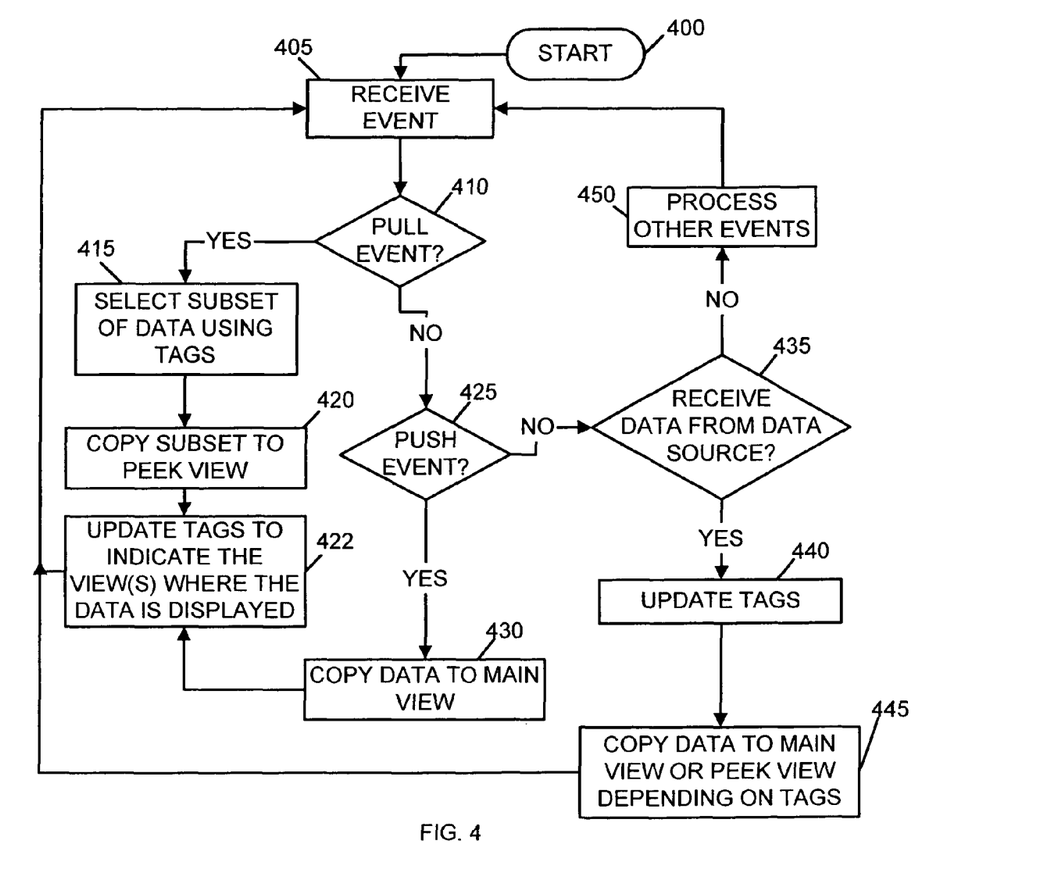
FIG. 4 depicts a flowchart of example processing, according to an embodiment of the invention.

FIG. 4 depicts a flowchart of example processing, according to an embodiment of the invention. Control begins at block 400. Control then continues to block 405 where the rendering agent 126 receives an event. Control then continues to bock 410 where the rendering agent 126 determines whether the event previously received at block 405 is a pull event. A pull event occurs in response to a user requesting data to be moved from the main view 205 to a peek view, e.g., the peek view 210. In an embodiment, the pull event occurs in response to the user selecting the pull icon 260.

If the determination at block 410 is true, then control continues to block 415 where the rendering agent 126 selects a subset of the data objects based on the associated importance tags 326 and optionally based on the peek view from which the pull event was received. For example, in an embodiment, the rendering agent 126 uses the size of the associated peek view to determine how deep in the importance ranking to travel when selecting the subset, with larger peek views displaying more data objects. Control then continues to block 420 where the rendering agent 126 copies the selected subset of data objects to the peek view from which the pull event was received. The rendering agent 126 uses the sort rule field 328 in the tags 130 to sort the data in the displayed data objects. Control then continues to block 422 where the rendering agent 126 updates the view field 324 in the tags 130 to indicate the view(s) where the data is displayed. Control then returns to block 405 where the rendering agent 126 receives the next event, as previously described above.

If the determination at block 410 is false, then the event previously received at block 405 is not a pull event, so control continues to from block 410 to block 425 where the rendering agent 126 determines whether the event previously received at block 405 is a push event. A push event occurs in response to a user requesting data to be moved from a peek view, e.g., the peek views 210, 215, or 220 to the main view 205. In an embodiment, the push event occurs in response to the user selecting the push icon 262. If the determination at block 425 is true, then control continues from block 425 to block 430 where the rendering agent 126 copies the data from the peek view that initiated the event to the main view 205. The rendering agent 126 further copies the data that was not in the subset associated with the peek view from the data 128 to the main view 205, so that the main view 205 contains a full set of data. Control then continues to block 422, as previously described above.

If the determination at block 425 is false, then the event previously received at block 405 is not a push event, so control continues to block 435 where the rendering agent 126 determines whether the event previously received at block 405 is a receive data from the data source 160 event. If the determination at block 435 is true, then the rendering agent 126 receives data from the data source 160 at the server 104 into the data 128 and continues to block 440 where the rendering agent 126 updates the tags 130 with the received data including updating the importance field 326 and the sort rule field 328 in an embodiment where they are included with the received data.

Control then continues to block 445 where the rendering agent 126 copies the data 128 to the main view 205 or the peek view (e.g., one the peek views 210, 215 or 220) depending on the contents of the view field 324 and the importance field 326 associated with the received data. The rendering agent 126 further sorts the data objects in the peek view using the sort rule 328. In this way, the data in the main view 205 and/or the peek views is dynamically updated. Control then returns to block 405 where the rendering agent 126 receives the next event, as previously described above.

If the determination at block 435 is false, then the event received at block 405 is not a receive data from data source event, so control continues to block 450 where the rendering agent 126 processes any other type of event that may be received. Control then returns to block 405 where the rendering agent 126 receives the next event, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
   selecting a subset of a first plurality of data objects based on a respective importance of each of the first plurality of respective data objects, wherein the first plurality of data objects are displayed in a main view, wherein the selecting is in response to a pull command at a peek view, wherein the pull command requests that the subset be moved from the main view to the peek view;
   copying the subset that was selected based on the respective importance to the peek view from which the pull command was received, wherein the subset in the peek view comprises fewer of the first plurality of data objects than the first plurality of data objects; and
   replacing the first plurality of data objects in the main view with a second plurality of data objects, wherein the second plurality of data objects are different from the first plurality of data objects.

2. The method of claim 1, wherein the selecting further comprises:
   selecting the subset based on a size of the peek view.

3. The method of claim 1, further comprising:
   receiving an update to the plurality of data objects; and
   modifying the subset in the peek view based on the update.

4. The method of claim 3, further comprising:
   re-selecting the subset based on a change to the importance, wherein the receiving further receives the change to the importance.

5. A storage medium encoded with instructions, wherein the instructions when executed comprise:
   selecting a subset of a first plurality of data objects based on a respective importance of each of the first plurality of respective data objects in response to a pull command from a peek view, wherein the first plurality of data objects are displayed in a main view, wherein the pull command requests that the subset be moved from the main view to the peek view;
   copying the subset that was selected based on the respective importance to the peek view from which the pull command was received, wherein the subset in the peek view comprises fewer of the first plurality of data objects than the first plurality of data objects; and
   replacing the first plurality of data objects in the main view with a second plurality of data objects, wherein the second plurality of data objects are different from the first plurality of data objects.

6. The storage medium of claim 5, wherein the selecting further comprises:
   selecting the subset based on a plurality of importance tags associated with the respective first plurality of respective data objects, wherein the respective importance tags specify a ranking of the first plurality of respective data objects.

7. The storage medium of claim 6, wherein the selecting further comprises:
   selecting the subset based on the plurality of importance tags and a size of the peek view.

8. The storage medium of claim 5, further comprising:
   receiving an update to the first plurality of data objects; and
   modifying the subset in the peek view based on the update.

9. The storage medium of claim 8, further comprising:
   modifying the first plurality of data objects in the main view based on the update.

10. An electronic device comprising:
    a processor; and
    a storage device encoded with instructions, wherein the instructions when executed on the processor comprise:
       selecting a subset of a first plurality of data objects based on a respective importance of each of the first plurality of respective data objects in response to a pull command from a peek view, wherein the first plurality of data objects are displayed in a main view, wherein the pull command requests that the subset be moved from the main view to the peek view,
       copying the subset that was selected based on the respective importance to the peek view from which the pull command was received, wherein the subset in the peek view comprises fewer of the first plurality of data objects than the first plurality of data objects,
       replacing the first plurality of data objects in the main view with a second plurality of data objects, wherein the second plurality of data objects are different from the first plurality of data objects,
       receiving an update to the first plurality of data objects, and
       modifying the subset in the peek view based on the update.

11. The electronic device of claim 10, wherein the selecting further comprises:
    selecting the subset based on a plurality of importance tags associated with the respective first plurality of respective data objects, wherein the respective importance tags specify a ranking of the first plurality of respective data objects.

12. The electronic device of claim 11, wherein the selecting further comprises:
   selecting the subset based on the plurality of importance tags and a size of the peek view.

13. The electronic device of claim 10, wherein the instructions further comprise:

copying the subset back to the main view in response to a push command from the peek view.

14. The electronic device of claim 10, wherein the instructions further comprise:
   sorting data in the subset in the peek view based on a sort rule associated with the data.

* * * * *